United States Patent [19]

Rule

[11] 3,928,742
[45] Dec. 23, 1975

[54] FLUID-TIGHT FLEXIBLE COVER

[75] Inventor: Clinton Rule, Beverly Farms, Mass.

[73] Assignee: Rule Industries, Inc., Gloucester, Mass.

[22] Filed: July 12, 1974

[21] Appl. No.: 487,873

[52] U.S. Cl. ............... 200/302; 74/17.8; 277/212
[51] Int. Cl.² ..................... F16J 15/50; H01H 9/04
[58] Field of Search ............ 200/302, 333; 74/17.8, 74/18.1, 18; 277/212 R, 212 C, 212 F, 212 FB, 205

[56] References Cited
UNITED STATES PATENTS

| 2,539,386 | 1/1951 | Albert | 74/17.8 |
| 3,322,445 | 5/1967 | Hassan | 277/212 |
| 3,343,855 | 9/1967 | Husen | 74/18 |
| 3,431,811 | 3/1969 | Yonkers | 74/17.8 X |
| 3,471,158 | 10/1969 | Solms | 200/333 X |
| 3,789,176 | 1/1974 | Pick | 200/302 |
| 3,790,734 | 2/1974 | Raab et al. | 200/302 |

Primary Examiner—James R. Scott
Assistant Examiner—William J. Smith
Attorney, Agent, or Firm—William N. Anastos

[57] ABSTRACT

There is disclosed a fluid-tight through-wall flexible cover arrangement adapted to enclose manipulable wares such as switches, shutter releases, valves and the like.

9 Claims, 3 Drawing Figures

FLUID-TIGHT FLEXIBLE COVER

FIELD OF THE INVENTION

The present invention relates generally to a fluid-tight through-wall cover arrangement and is more particularly concerned with fluid-tight flexible cover arrangements for manipuable wares.

In the design and construction of various apparatus adapted for use while submersed in fluids such as underwater cameras, explosion-proof or underwater lamps and electrical tools, submersible battery operated pumps and the like, it is often necessary to enclose all or a portion of the apparatus in a fluid-tight enclosure in order to isolate and afford protection of various components of the apparatus from the fluid environment. Such apparatus generally further requires that means be provided by which it may be placed into operation and/or controlled from the exterior of such fluid-tight enclosure. Thus, there exists a need for a flexible through-wall cover arrangement by which mechanically or manually manipulable wares such as electrical switches, variable resistors, shutter releases and the like can be physically isolated from the fluid environment and yet be readily manipulated. In accordance with the present invention the above-defined need has been met.

OBJECTS OF THE INVENTION

It is a principal object of the invention to provide a novel, flexible, through-wall, fluid-tight cover arrangement.

It is another object of the present invention to provide a novel flexible through-wall fluid-tight cover arrangement for manipulable wares wherein there is provided facility of operation of such wares.

It is yet another object of the invention to provide a rapidly assemblable, flexible, through-wall, fluid-tight cover arrangement for manipulable wares.

It is still another object of the invention to provide a flexible, through-wall, fluid-tight cover arrangement for manipulable wares contained in fluid-tight enclosures, housings, vessels and the like, which arrangement is characterized by superior security of the fluid-tight relationship.

It is still another object of the invention to provide flexible, through-wall, fluid-tight cover arrangement which is inexpensive to build and which involves no threaded parts.

Other objects and advantages of the present invention will in part be obvious and will in part appear hereinafter.

SUMMARY OF THE INVENTION

The flexible fluid-tight through-wall cover arrangement of the instant invention comprises, in combination: a walled fluid-tight enclosure having an aperture adapted to receive or expose a manipulable ware therethrough; a wall surrounding said aperture and defining a continuous dam thereabout; a flexible thimble composed of a fluid-impervious material, the open end of which thimble comprises a flange corresponding to the rim of said dam; and retainer ring means comprising an internal flange adapted to compress or bias the flange of said thimble against the rim of said dam and a peripheral depending sidewall having a plurality of tabs projecting interiorly therefrom, said tabs being adapted to engage the exterior sidewall of said dam in locking engagement therewith.

THE DRAWINGS

DESCRIPTION OF PREFERRED EMBODIMENTS

Figure 1:
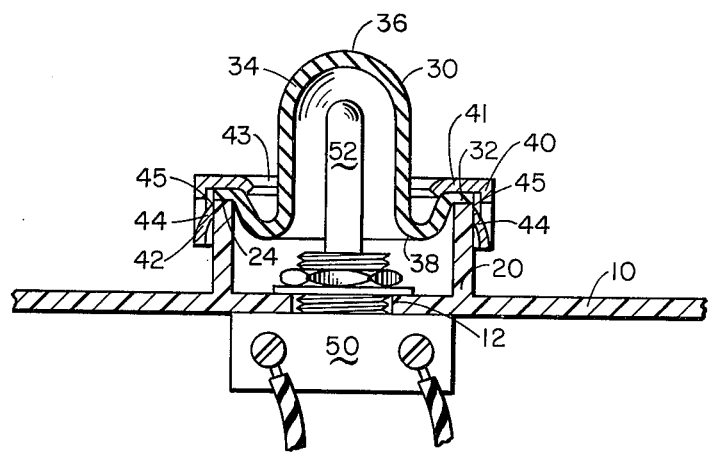
FIG. 1 is a schematic, diagrammatic, partially sectional side view of the flexible fluid-tight through-wall cover arrangement of the invention.
Figure 2:
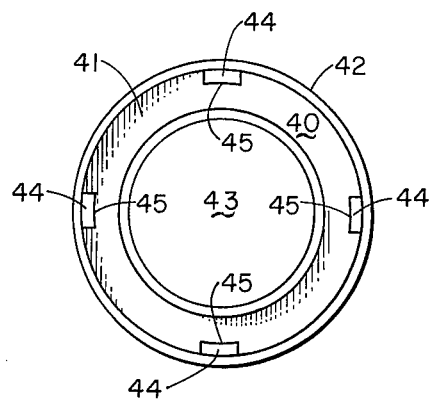
FIG. 2 is a schematic, diagrammatic bottom view of the retainer ring means 40 of FIG. 1.
Figure 3:
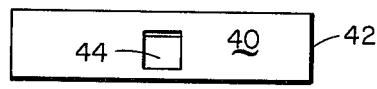
FIG. 3 is a schematic, diagrammatic side view of the retainer ring means 40 of FIGS. 1 and 2.

Referring now to FIGS. 1 through 3 hereof, wherein like reference numerals refer to like structures, the flexible fluid-tight through-wall cover arrangement of the invention generally comprises enclosure wall 10, dam 20, thimble 30 and retainer ring 40. Enclosure wall 10 is representative of a walled, fluid-tight vessel, housing or enclosure within which there is disposed an apparatus or manipulable ware which it is desired be maintained out of contact with a fluid environment. Accordingly, wall 10 can comprise a portion of the general fluid-tight enclosure for a submersible pump, underwater camera, explosion-proof flashlight, underwater floodlight, and the like. Alternatively, wall 10 can also comprise a portion of a fluid-tight enclosure adapted specifically to contain therein manipulable ware 50. Aperture 12 penetrates wall 10, said aperture 12 being adapted to receive or expose therethrough manipulable element 52 of mechanically controlled or operated ware 50, such as an electric toggle, pushbutton or slide switch. It will be understood, of course, that a switch is merely illustrative of the arrangement of the invention and that the invention is not to be construed as being limited thereby. Accordingly, various other wares such as valves, variable resistors, triggers, shutter releases and the like can also serve as manipulable ware 50.

Completely circumscribing aperture 12 is continuous dam 20 which is affixed to enclosure wall 10 in fluid-tight relationship therewith. Accordingly, dam 20 can generally be affixed to wall 10 by gluing, adhesive bonding, thermal or solvent welding, soldering, brazing or in any other manner which results in a fixed and fluid-tight association. Where, however, enclosure wall 10 is composed of a thermoplastic polymeric material and is formed by such techniques as blow molding or injection molding, it will often be possible and convenient to conjointly and integrally form dam 20 and enclosure wall 10.

While the specific preferred embodiment of the fluid-tight cover arrangement depicted in FIGS. 1 through 3 hereof comprises a dam 20 having a circular geometry, it should be noted and understood that other geometric forms of dam 20 are also generally suitable provided, of course, that appropriate correspondent relationships of critical portions of thimble 30 and ring 40 are maintained. Said relationships will be discussed in more detail hereinafter. Suffice it to say, therefore, that dam 20 can also generally comprise a square, oblong, ovoid, triangular or polygonal geometry.

In order to ensure the fluid-tight nature of the cover arrangement of the invention, it is generally much preferred that rim 24 of dam 20 be substantially planar, in other words that rim 24 be substantially flat and without substantial fault about its entire circumference. It is also preferred that rim 24 have as small a thickness as possible without, however, being so sharp as to sever flange 32.

Thimble 30 is composed of a resilient fluid-impervious material, thereby to provide the dual functions of (1) establishing the fluid-tight nature of the overall cover arrangement, and (2) providing the flexibility required to assure convenient operability of manipulable element 52. Accordingly, thimble 30 can generally be composed of a resilient plastomeric or elastomeric material such as natural rubber, polyvinylchloride, polyisoprene, polychloroprene, ethylenepropylene diene rubber, butadiene-acrylonitrile rubber, flexible polyurethane, butyl rubber, chloro- or chlorosulfonated rubbers, silicone rubber, polyether rubber, polysulfide rubber, polybutadiene, polyacrylate rubber, and the like. Included in the above, of course, are various of the plastomeric or elastomeric impregnated fabrics. Where the fluid environment is predominantly aqueous, I have found that ethylenevinylacetate represents a particularly useful material of construction for thimble 30. In addition to its resilient and water-impervious nature, said polymeric material generally has excellent forming properties.

Importantly, the open end of thimble 30 takes the form of an external flange 32, which flange corresponds to, and is adapted to overlie, rim 24 of dam 20. Said flange 32 serves a principal role in the achievement of fluid-tight sealing.

In order to maximize flexibility of operations and in order to more broadly distribute operational stresses, it is generally preferred that thimble 30 be of invaginated form, that is to say, that said thimble 30 be partially turned upon itself. Said invagination is clearly shown in FIG. 1 wherein there is disclosed thimble 30 whose wall 34 extends downwardly from apex 36 to a plane substantially below that of flange 32. At said lower plane, wall 34 turns outwardly upon itself, thereby to form an invagination 38. From the lowermost plane defined by invagination 38, wall 34 thence extends upwardly and outwardly and terminates in flange 32. The presence of invagination 38 results in additional flexibility of thimble 30, particularly with respect to the available range of to and fro motion thereof. This, of course, can be important where manipulable element 52 requires such to and fro motion for operation, such as would be required by a toggle switch. Too, invagination 38 tends to distribute operational stresses and strains thereover and mitigates against concentration of such stresses and strains at a particular location of thimble 30, such as at flange 32 thereof.

Retainer ring 40, which can conveniently be composed of thin sheet metal such as mild steel, comprises an internal flange member 41 and an external sidewall member 42. Flange 41 defines an aperture 43 which is adapted to freely receive flexible thimble 30 therethrough. Further, flange 41 is so proportioned as to correspond to and overlie flange 32 of thimble 30. Sidewall 42 depends peripherally from flange 41 and is so proportioned as to fit in nesting relationship over dam 20. An additional important feature of sidewall 42 resides in the presence of a plurality of tabs 44 projecting interiorly from about the circumference thereof and oppositely to the direction of travel of sidewall 42 during assembly. The internal projection of tabs 44 should be such that free ends 45 thereof, taken together, define a space sufficiently small as to provide a tight, at least interference type, fit to or with dam 20 therewithin. Generally, free ends 45 of tabs 44 should also present a sharp edge to said dam 20 and should be composed of a substantially harder material than that of said dam. By adherence to these criteria, it is further assured that tabs 44 will tightly engage dam 20 and that free ends 45 will fault or score the surface of the dam. Said faulting of dam 20 by free ends 45 is desirable since it mitigates against retrograde motion of ring 40 relative to dam 20 subsequent to assembly. Thus, adherence to the criteria defined above aids substantially in the achievement of a secure locking and sealing engagement of the cover arrangement of the invention.

In assembling the cover arrangement of the invention, thimble 30 is placed on dam 20 in a manner such that flange 32 overlies rim 24 continuously about its circumference. Ring 40 is placed over thimble 30 and sidewall 42 forced downwardly over dam 20, thereby disposing the plurality of tabs 44 in locking engagement with dam 20 while also biasing or compressing resilient flange 32 of thimble 30 between internal flange 41 of ring 40, and rim 24 of dam 20. Said compression or biasing of flange 32 results in sealing thereof against rim 24 and completes the fluid-tight nature of the flexible cover arrangement of the invention.

What is claimed is:

1. A flexible fluid-tight through-wall cover arrangement for manipulable wares comprising:
    A. a walled fluid-tight enclosure having an aperture adapted to receive or expose the manipulable element of a ware therethrough;
    B. a continuous wall defining a dam surrounding said aperture, said dam having a rim;
    C. a flexible thimble composed of a resilient fluid-impervious material, the open end of which thimble comprises an external flange corresponding to and overlying the rim of said dam;
    D. retainer ring means comprising (i) an internal flange member adapted to overlie said external flange of said flexible thimble, and (ii) locking means adapted to lockingly engage said dam and to maintain said external flange member of said flexible thimble in a fluid-sealing compressed state between said internal flange member and the rim of said dam.

2. The arrangement of claim 1 wherein said rim of said dam is substantially planar.

3. The arrangement of claim 1 wherein said dam and said walled fluid-tight enclosure are each composed of a thermoplastic material and wherein said dam is integrally formed with said walled fluid-tight enclosure.

4. The arrangement of claim 1 wherein said flexible thimble is invaginated intermediate the apex and external flange thereof and at a level below said flange.

5. The arrangement of claim 1 wherein said retainer ring means is composed of thin sheet metal.

6. A flexible fluid-tight through-wall cover arrangement for manipulable wares comprising:
    A. a walled fluid-tight enclosure having an aperture adapted to receive or expose the manipulable element of a ware therethrough;
    B. a continuous wall defining a dam surrounding said aperture, said dam having a rim;
    C. a flexible thimble composed of a resilient fluid-impervious material, the open end of which thimble comprises an external flange corresponding to and overlying the rim of said dam;
    D. retainer ring means comprising (i) an internal flange member adapted to overlie said external flange of said flexible thimble, and (ii) an external sidewall member depending from said internal flange member, said sidewall member being adapted to nest over said dam and said sidewall member comprising a plurality of locking tabs projecting inwardly therefrom and oppositely to the direction of travel of said sidewall member during assembly over said dam, the free ends of said tabs defining a space having a shape and sufficiently small size to provide at least an interference fit of said dam therein.

7. The arrangement of claim 6 wherein the free ends of said tabs are composed of a material substantially harder than the material of said dam and wherein each of said free ends presents a sharp edge to said dam, thereby to fault the surface thereof.

8. The arrangement of claim 6 wherein said dam and said walled fluid-tight enclosure are each composed of a thermoplastic material and wherein said dam is integrally formed with said walled fluid-tight enclosure.

9. The arrangement of claim 6 wherein said flexible thimble is invaginated intermediate the apex and external flange thereof and at a level below said flange.

* * * * *